(12) United States Patent
Ho et al.

(10) Patent No.: US 8,485,146 B2
(45) Date of Patent: Jul. 16, 2013

(54) ENGINE DEVICE

(75) Inventors: Hui-Chun Ho, Hsinchu County (TW);
Shao-Yu Li, Hsinchu County (TW);
Min-Chuan Wu, Hsinchu (TW);
Ta-Chuan Liu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 312 days.

(21) Appl. No.: 13/009,316

(22) Filed: Jan. 19, 2011

(65) Prior Publication Data

US 2012/0126545 A1    May 24, 2012

(30) Foreign Application Priority Data

Nov. 24, 2010 (TW) .............................. 99140669 A

(51) Int. Cl.
*F02B 71/00* (2006.01)

(52) U.S. Cl.
USPC .......... 123/46 R; 310/10; 310/12.01; 417/374

(58) Field of Classification Search
USPC ............ 290/1 A; 417/374; 123/46 R; 310/10, 310/12.01
See application file for complete search history.

(56) References Cited

U.S. PATENT DOCUMENTS

| | | | |
|---|---|---|---|
| 3,610,216 A | 10/1971 | Braun | |
| 3,610,217 A | 10/1971 | Braun | |
| 3,859,966 A | 1/1975 | Braun | |
| 5,540,194 A | 7/1996 | Adams | |
| 6,541,875 B1 | 4/2003 | Berlinger et al. | |
| 2002/0067999 A1* | 6/2002 | Suitou et al. .................. | 417/374 |
| 2003/0009888 A1* | 1/2003 | Marinkovich et al. .......... | 30/394 |
| 2009/0193805 A1* | 8/2009 | Berchowitz et al. ............ | 60/520 |

FOREIGN PATENT DOCUMENTS

| | | |
|---|---|---|
| CN | 1766292 A | 5/2006 |
| DE | 19943993 A1 | 3/2001 |
| JP | 6288253 A | 10/1994 |
| JP | 2003343202 A | 12/2003 |
| JP | 2007285176 A | 11/2007 |
| KR | 100893335 B1 | 4/2009 |
| TW | 212824 | 9/1993 |
| TW | I244442 | 12/2005 |
| TW | I245728 | 12/2005 |
| TW | I281892 | 6/2007 |

OTHER PUBLICATIONS

Intellectual Property Office, Ministry of Economic Affairs, R.O.C., "Office Action", Aug. 9, 2012, Taiwan.
Mikalsen et al., A review of free-piston engine history and applications, Applied Thermal Engineering, 2007, pp. 2339-2352, vol. 27, Elsevier Ltd.
Goertz et al., Free Piston Engine Its Application and Optimization, SAE Technical Paper Series, 2000, pp. 1-10, ISSN 0148-7191, 2000 Society of Automotive Engineers, Inc., USA.
Arshad et al., Integrated Free-Piston Generators: An Overview, IEEE NORPIE-02, 2002, Stockholm.

* cited by examiner

*Primary Examiner* — Thanh K Truong
*Assistant Examiner* — Ruben Picon-Feliciano
(74) *Attorney, Agent, or Firm* — Morris Manning & Martin LLP; Tim Tingkang Xia, Esq.

(57) ABSTRACT

An engine device includes an engine, a power generating portion, a motor portion, and a transmission mechanism. The engine includes a piston and a cylinder, and the piston is arranged in the cylinder and moves back and forth between a top dead center and a bottom dead center. The power generating portion and the motor portion are annularly disposed on the periphery of the cylinder. When the piston moves from the top dead center towards the bottom dead center, the transmission mechanism drives a power generating rotor of the power generating portion to move correspondingly in a direction opposite to that of the piston and enables the power generating portion to generate electric power. When the piston is located at the bottom dead center, the motor portion actuates a motor rotor to move, and pushes the piston to move towards the top dead center through the transmission mechanism.

12 Claims, 5 Drawing Sheets

ENGINE DEVICE

CROSS-REFERENCE TO RELATED APPLICATIONS

This non-provisional application claims priority under 35 U.S.C. §119(a) on Patent Application No(s). 099140669 filed in Taiwan, R.O.C. on Nov. 24, 2010, the entire contents of which are hereby incorporated by reference.

BACKGROUND

1. Field

The present disclosure relates to an engine device, and more particularly to a single-cylinder linear engine device.

2. Related Art

To cater to the climate change of global environment and the trend of energy saving and carbon reduction, electric motorcycles or other small-sized vehicles meeting the demands for green energy and convenience in personal travel have become one of focuses in the development of the vehicle industry. However, a pure electric motorcycle, limited by the battery power supply capability, does not have ideal mileage endurance, and if the traveling mileage is increased by simply increasing the number of batteries, not only the cost of the electric motorcycle is increased, but also the overall weight and volume of the electric motorcycle are increased, thereby reducing the convenience of the electric motorcycle in use.

Therefore, the technology of hybrid electric vehicle is put forward in the industry, in which an engine power generator (for example, a linear engine power generator formed by combining a free piston engine with a linear motor assembly) is employed to extend the mileage, and the linear engine power generator having high specific power and power density can reduce the influence of the weight and volume of the vehicle.

Current linear engine motor assemblies are mostly of a double-cylinder (two cylinders) structure or more, in which a power generator is disposed between the two cylinders to generate electric power. However, in the double-cylinder configuration, the double-cylinder linear engine usually has the problem that the linear engine motor assembly vibrates due to an axial force, and if the double-cylinder configuration is changed to four-cylinder configuration, although the axial force can be counteracted, the problem of torque arises. Although an eight-cylinder linear engine motor assembly can solve the problems of axial force and torque, for electric motorcycles or other small-sized vehicles, the eight-cylinder configuration has the disadvantage of excessively large volume, and further, the design of multi-cylinder configuration necessarily is combined with multiple groups of pistons, which will increase the difficulty in controlling the position synchronization of the pistons.

SUMMARY

Accordingly, the present disclosure is an engine device, in which the engine device is a single-cylinder linear engine, and an axial force in the operation of the engine device is counteracted through opposite moving directions of a piston and a rotor of a power generator and a rotor of a motor, so as to solve the above problems.

The present disclosure provides an engine device, which comprises an engine, a power generating portion, a motor portion, and a transmission mechanism. The engine comprises a piston and a cylinder, and the piston is arranged in the cylinder and moves back and forth between a top dead center and a bottom dead center. The power generating portion is annularly disposed on the periphery of the cylinder and comprises a power generating rotor and a power generating stator. The power generating portion generates electric power when the power generating rotor and the power generating stator make a relative movement. The motor portion is annularly disposed on the periphery of the cylinder and comprises a motor rotor and a motor stator. The motor portion actuates the motor rotor and the motor stator to produce a relative movement when the piston is located at the bottom dead center. The transmission mechanism is connected between the piston, the motor rotor, and the power generating rotor. When the piston moves from the top dead center towards the bottom dead center, the transmission mechanism drives the power generating rotor to move correspondingly in a direction opposite to that of the piston and enables the power generating rotor and the power generating stator to produce the relative movement. When the motor rotor and the motor stator produce the relative movement, the motor rotor moves the piston from the bottom dead center towards the top dead center through the transmission mechanism.

The transmission mechanism comprises a rotor connecting member and a piston connecting member, the rotor connecting member is connected in series to the power generating rotor and the motor rotor, and the piston connecting member is connected to the piston, so that a moving direction of the power generating rotor and the motor rotor is opposite to that of the piston. Therefore, when the piston moves from the top dead center to the bottom dead center, the piston drives the power generating portion to generate electric power, and then the motor portion pushes the piston to be restored from the bottom dead center to the top dead center.

Therefore, through the engine device provided in the present disclosure, the axial force in the operation of the engine can be counteracted by using the transmission mechanism which enables the power generating rotor and the motor rotor to move in a direction opposite to that of the piston. In addition, in the single-cylinder linear engine according to the present disclosure, the piston is pushed to move towards the bottom dead center by an impact force generated by a fuel after explosion (explosion stroke), and when the piston is located at the bottom dead center, the piston is pushed back to the top dead center by motor driving (compression stroke) without disposing a restoring mechanism at a position corresponding to the bottom dead center to provide another impact force to help restoring the piston. Therefore, the efficacies of shortened engine device, reduced number of elements required, simple specifications of motor and power generator, and simple control method can be achieved.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1A:
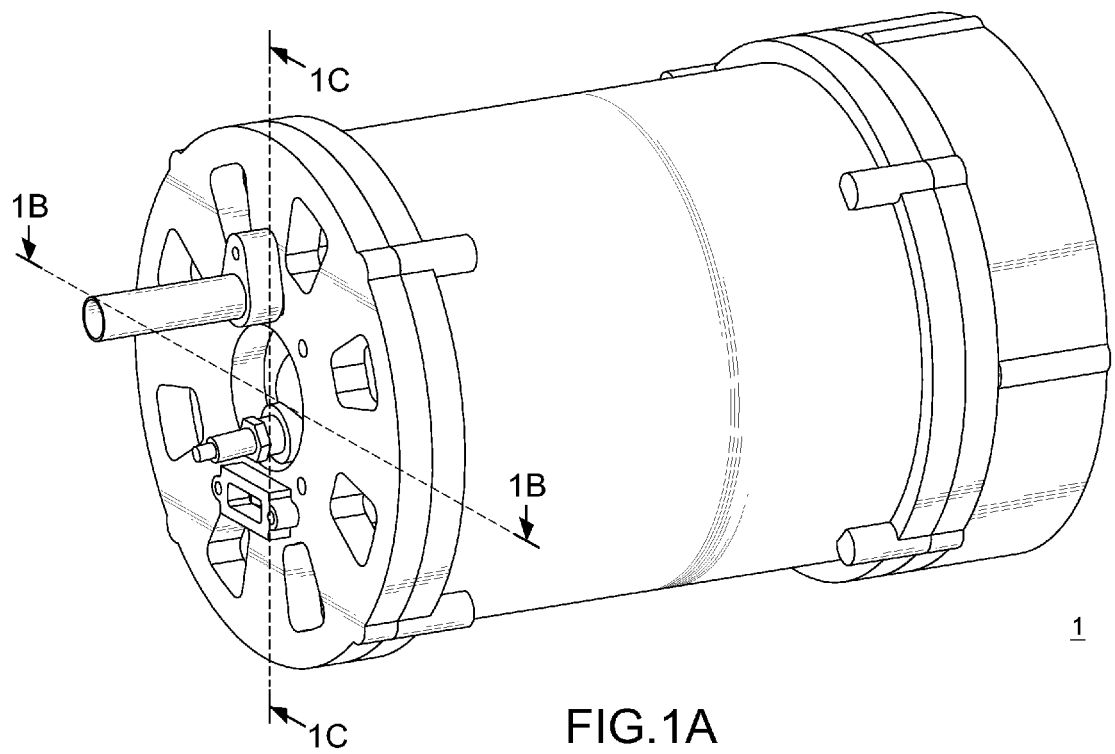
FIG. 1A is a schematic view of an engine device according to the present disclosure.
Figure 1B:
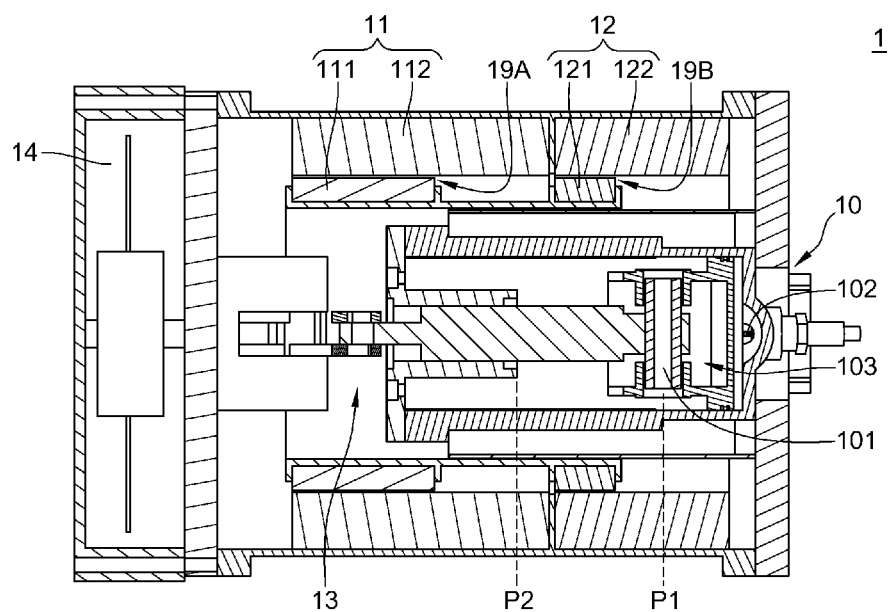
FIG. 1B is a schematic cross-sectional view of FIG. 1A.
Figure 1C:
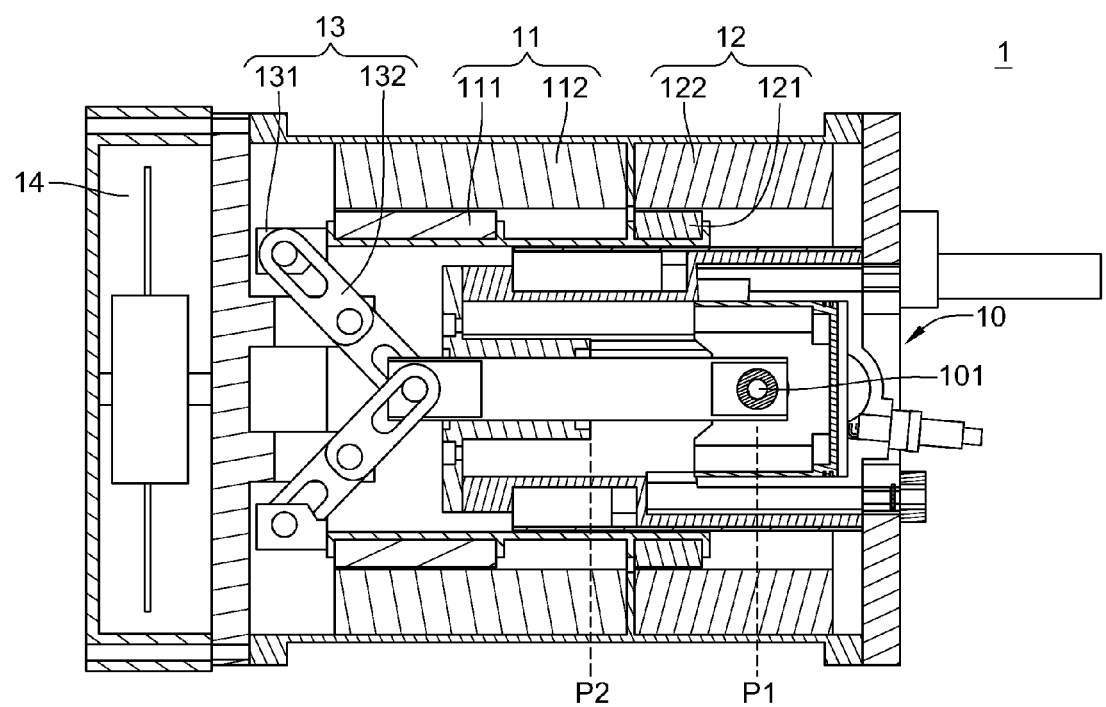
FIG. 1C is another schematic cross-sectional view of FIG. 1A.

FIG. 1A is a schematic view of an engine device according to the present disclosure; FIG. 1B is a schematic cross-sectional view of FIG. 1A; and FIG. 1C is another schematic cross-sectional view of FIG. 1A. Referring to FIGS. 1A to 1C, an engine device 1 comprises an engine 10, a power generating portion 11, and a motor portion 12. The engine 10 comprises a piston 101 and a cylinder 102. The piston 101 is arranged in the cylinder 102, and moves back and forth between a top dead center P1 and a bottom dead center P2. A space 103 is provided between the cylinder 102 and the piston 101, and is filled with a fuel (not shown). When the piston 101 is located near the top dead center P1, the fuel is ignited and generates an impact force, so as to push the piston 101 to move from the top dead center P1 towards the bottom dead center P2.

When the engine device 1 detects that the piston 101 moves from the top dead center P1 towards the bottom dead center P2, the engine device 1 drives the power generating portion 11 (that is, the engine device 1 controls the power generating portion 11 to be in an ON state and able to generate a current), so that the power generating portion 11 starts power generation under the driving of the piston 101. When the engine device 1 detects that the piston 101 is located at the bottom dead center P2, the engine device 1 controls the power generating portion 11 to stop power generation, and actuates the motor portion 12, so that the motor portion 12 operates to push the piston 101 to move towards the top dead center P1 (the compression stroke of the engine is performed). Generally speaking, the engine device 1 mostly detects the position of the piston 101 through a sensor, and the position of the piston 101 may affect the control of the engine stroke.

Figure 2A:
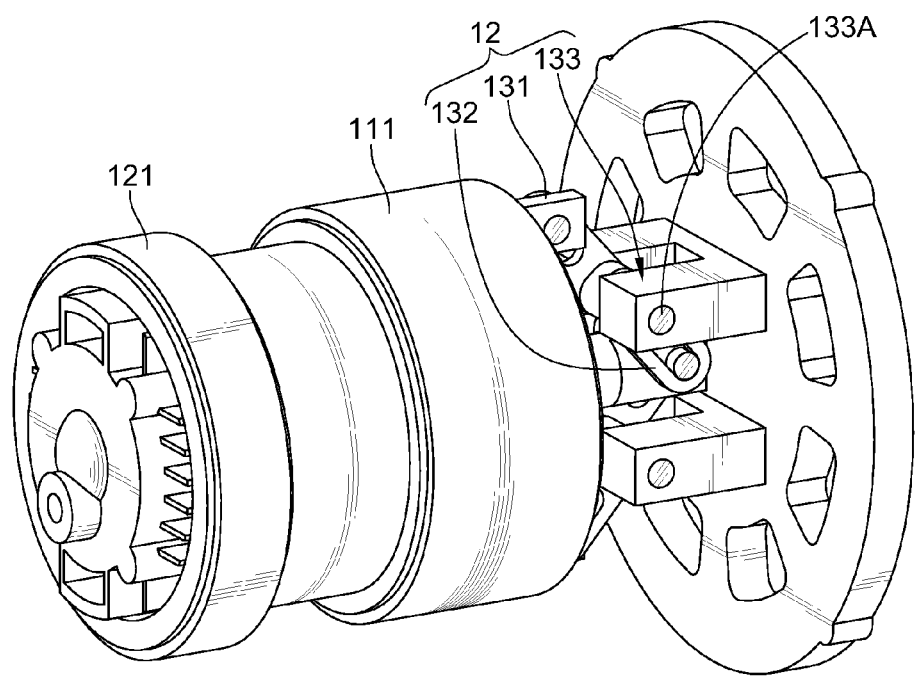
FIG. 2A is a schematic view of a power generating rotor and a motor rotor of the engine device according to the present disclosure.
Figure 2B:
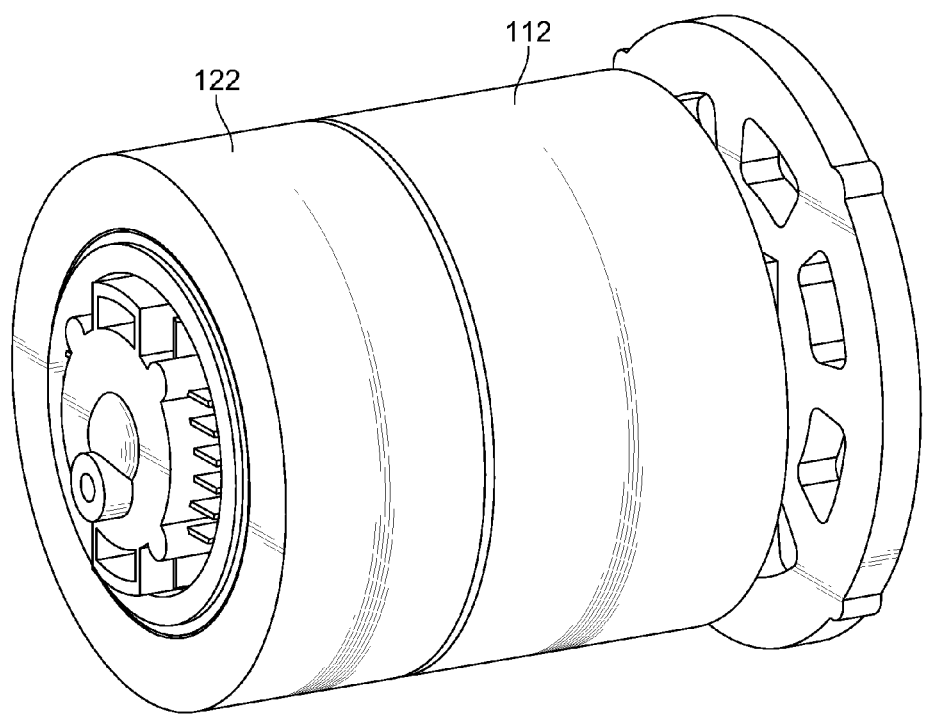
FIG. 2B is a schematic view of a power generating stator and a motor stator of the engine device according to the present disclosure.

FIG. 2A is a schematic view of a power generating rotor and a motor rotor of the engine device according to the present disclosure; and FIG. 2B is a schematic view of a power generating stator and a motor stator of the engine device according to the present disclosure. Referring to FIGS. 1C, 2A, and 2B, the power generating portion 11 comprises a power generating rotor 111 and a power generating stator 112. The motor portion 12 comprises a motor rotor 121 and a motor stator 122. The power generating rotor 111 is a cylindrical structure, the cylindrical structure is fitted on (or coaxially wraps) the engine 10, and a plurality of power generating magnets (not shown) is arranged outside the cylindrical structure. The power generating stator 112 comprises an annular case fitted on the power generating rotor 111, and a power generating coil (not shown) is disposed radially inside the annular case at an air gap 19A with the power generating magnets. The motor rotor 121 is a cylindrical structure, the cylindrical structure is fitted on the engine 10, and a plurality of motor magnets (not shown) is arranged outside the cylindrical structure. The motor stator 122 comprises an annular case fitted on the motor rotor 121, and a motor coil (not shown) is disposed radially inside the annular case at an air gap 19B with the motor magnets.

Although the above power generating portion 11 and motor portion 12 are two independent members each having independent magnets and coil required for electromagnetic induction, for the engine device 1, when the power generating rotor 111 intends to perform power generation induction with the power generating stator 112 (the power generating portion 11 is in an ON state), the motor portion 12 (the motor rotor 121) is in an OFF state, and they are impossible to be driven at the same time. Thus, the rotors 111 and 121 of the power generating portion 11 and the motor portion 12 may be a common rotor. The quality of the common rotor does not affect the reciprocating speed of the rotors 111 and 121.

The piston 101, the power generating portion 11, and the motor portion 12 are connected by a transmission mechanism 13, and the transmission mechanism 13 enables the power generating portion 11 and the motor portion 12 to respectively move correspondingly with the piston 101 in opposite directions.

It should be noted that, since the power generating rotor 111 and the power generating stator 112 are shaped like a cylinder fitted on the engine 10, when the piston 101 and the power generating rotor 111 move in opposite directions, an axial force between the piston 101 and the power generating rotor 111 is counteracted through the transmission mechanism 13, and the cylindrical structure of the power generating rotor 111 does not have the problem of torque; similarly, when the motor portion 12 pushes the piston 101 to be restored, the piston 101 and the motor rotor 121 move in opposite directions, and the problems of axial force and torque do not occur, either.

Further, the power generating portion 11 and the motor portion 12 are both designed to be a cylindrical outer ring structure, which can increase the area of magnet arrangement, and reduce the electromagnetic force provided by a single magnet under the same electromagnetic force requirement, and also reduce the volume of coil winding, thereby reducing the diameter of the engine device 1.

In addition, when the piston 101 moves from the top dead center P1 to the bottom dead center P2, the power generating portion 11 is turned on (the motor portion 12 is turned off), the power generating portion 11 moves towards the top dead center P1 due to the movement of the piston 101 in the opposite direction, and the magnets of the power generating rotor 111 do not get close to the piston 101, so that the magnetism of the magnets is not affected by the temperature of the piston 101, and thus the magnets can maintain desirable electromagnetic properties.

The transmission mechanism 13 being a combination of connecting rods is taken as an embodiment for illustration, but is not intended to limit the present disclosure. The transmission mechanism 13 may also be achieved by a combination of gears or cams. The transmission mechanism 13 comprises a fixing portion 133, a rotor connecting member 131, and a piston connecting member 132. The fixing portion 133 has a pivoting portion 133A. The rotor connecting member 131 has a first end portion and a second end portion, the first end portion of the rotor connecting member 131 is connected in series to the power generating rotor 111 and the motor rotor 121, and the second end portion of the rotor connecting member 131 is pivoted to the pivoting portion 133A. The piston connecting member 132 has a third end portion and a fourth end portion, the third end portion of the piston connecting member 132 is connected to the piston 101, and the fourth end portion of the piston connecting member 132 is pivoted to the pivoting portion 133A and the second end portion of the rotor connecting member 131. When the piston 101 moves from the top dead center P1 to the bottom dead center P2, the piston connecting member 132 pivoted to the pivoting portion 133A drives the rotor connecting member 131, so that the power generating rotor 111 moves correspondingly with the piston 101 in an opposite direction. When the piston 101 is at the bottom dead center P2, the motor portion 12 pushes the piston 101 to be restored from the bottom dead center P2 to the top dead center P1.

It should be noted that, the engine device 1 according to the present disclosure only controls the power generating portion 11 or motor portion 12 to operate at a time. When the engine 10 is in a compression stroke (the piston 101 moves towards the top dead center P1), the motor portion 12 operates, that is, the engine device 1 actuates the motor portion 12 (the engine device 1 inputs a driving signal to the motor stator 122), so that the motor rotor 121 and the motor stator 122 produce a relative movement (that is, the motor rotor 121 moves towards the left side of FIG. 1C), and the piston 101 moves towards the top dead center P1 (that is, towards the right side of FIG. 1C) due to the transmission of the transmission mechanism 13.

Then, when the engine 10 is in an explosion stroke (the piston 101 moves towards the bottom dead center P2, that is, towards the left side of FIG. 1C), the engine device 1 actuates the power generating portion 11. At this time, since the piston 101 moves towards the bottom dead center P2, the power generating rotor 111 may move towards the right side of FIG. 1C due to the transmission of the transmission mechanism 13, and thus produce a relative movement with the power generating stator 112 for power generation.

As can be known from the above description, when the motor portion 12 operates, the motor portion 12 drives the motor rotor 121 to move towards the left side of FIG. 1C, and thus the driving signal of the engine device 1 for driving the motor portion 12 is relatively simple, while when the power generating portion 11 operates, the power generating rotor 111 moves towards the right side of FIG. 1C, and thus the electric power transmitted back from the power generating stator 112 and received by the engine device 1 flows in one direction only without requiring the use of a brush or other control circuits to control the current direction of the received electric power. In this way, the control circuit of the engine device 1 is not as complex as that of the conventional power generator.

In addition, the above actions of detecting that the piston 101 is located at the top dead center P1 and the bottom dead center P2 and actuating the motor portion 12 and the power generating portion 11 by the engine device 1 all can be implemented by a control unit.

Further, as can be seen from FIGS. 1C and 2A, the transmission mechanism 13 is arranged in a manner of being symmetrical to the cylinder 102 with respect to a central axis. Thus, when the engine 10 operates, and the piston 101 enables the power generating rotor 111 and the motor rotor 121 to move correspondingly through the transmission mechanism 13, vibration is reduced due to the symmetrical arrangement.

Referring to FIGS. 1B and 1C, the engine device 1 according to the present disclosure further comprises an extraction fan 14, and the extraction fan 14 is disposed at an end of the engine device 1 different from the end where the cylinder 102 is disposed. In this way, thermal energy from the cylinder 102 (where the thermal energy is generated) can produce an air flow to perform cooling or heat dissipation.

In addition, an integrated starter generator (ISG) has electric components (or referred to as an electric motor or motor portion) and power generating components (or referred to as a power generating portion), so that the ISG can employ the above architecture of the present disclosure, and can have the advantages of the present disclosure.

Therefore, through the structures like the transmission mechanism, the power generating rotor, the motor rotor, and the piston provided in the present disclosure, the engine device itself has the balancing function, and does not have the disadvantage that the axial force causes vibration of the engine device. Moreover, since the power generating portion and the motor portion are designed as annular structures, the problem of torque does not arise. Further, the design of a single-cylinder structure in the present disclosure has advantages such as reduced volume of the engine and a small number of elements required, which can reduce the manufacturing cost and improve the market competitiveness of the engine device.

What is claimed is:

1. An engine device, comprising:
   an engine, comprising a piston and a cylinder, wherein the piston is arranged in the cylinder and moves between a top dead center and a bottom dead center;
   a power generating portion, annularly disposed on the periphery of the cylinder and comprising a power generating rotor and a power generating stator, wherein the power generating rotor moves in a rectilinear motion, and the power generating portion generates electric power when the power generating rotor and the power generating stator make a relative movement;
   a motor portion, annularly disposed on the periphery of the cylinder and comprising a motor rotor and a motor stator, wherein the motor rotor moves in a rectilinear motion, and the motor portion actuates the motor rotor and the motor stator to produce a relative movement when the piston is located at the bottom dead center; and
   a transmission mechanism, connected between the piston, the motor rotor, and the power generating rotor, wherein when the piston moves from the top dead center towards the bottom dead center, the transmission mechanism drives the power generating rotor to move correspondingly in a direction opposite to that of the piston and enables the power generating rotor and the power generating stator to produce the relative movement, and when the motor rotor and the motor stator produce the relative movement, the motor rotor moves the piston from the bottom dead center towards the top dead center through the transmission mechanism.

2. The engine device according to claim 1, comprising:
   a rotor connecting member, connected in series to the power generating rotor and the motor rotor; and
   a piston connecting member, connected to the piston and the rotor connecting member, wherein the piston connecting member drives the rotor connecting member, so that a moving direction of the power generating rotor and the motor rotor is opposite to that of the piston.

3. The engine device according to claim 2, wherein the transmission mechanism further comprises a fixing portion, the fixing portion has a pivoting portion, the rotor connecting member comprises a first end portion and a second end portion, the first end portion is connected to the power generating rotor and the motor rotor, the second end portion is pivoted to the pivoting portion, the piston connecting member comprises a third end portion and a fourth end portion, the third end portion is connected to the piston, and the fourth end portion is pivoted to the pivoting portion and the second end portion.

4. The engine device according to claim 2, wherein the transmission mechanism further comprises a gear structure or a cam structure, for connecting the rotor connecting member and the piston connecting member.

5. The engine device according to claim 1, wherein the motor rotor comprises a cylindrical structure and a plurality of motor magnets, the cylindrical structure is fitted on the engine, and the motor magnets are disposed outside the cylindrical structure.

6. The engine device according to claim 5, wherein the motor stator comprises an annular case fitted on the motor rotor, and a motor coil is disposed radially inside the annular case at an air gap with the motor magnets.

7. The engine device according to claim 1, wherein the power generating rotor comprises a cylindrical structure and a plurality of power generating magnets, the cylindrical structure is fitted on the engine, and the power generating magnets are disposed outside the cylindrical structure.

8. The engine device according to claim 7, wherein the power generating stator comprises an annular case fitted on the power generating rotor, and a power generating coil is disposed radially inside the annular case of the power generating stator at an air gap with the power generating magnets.

9. The engine device according to claim 1, further comprising an extraction fan disposed at an end of the engine device different from the engine.

10. An engine device, comprising:
   an engine, comprising a piston and a cylinder, wherein the piston is arranged in the cylinder and displaced between a top dead center and a bottom dead center;
   a power generating portion, comprising a power generating stator;
   a motor portion, comprising a motor stator;
   a common rotor, driven to move in a rectilinear motion by the piston to interact with the power generating stator for power generation when the piston moves from the top dead center towards the bottom dead center, and interact with the motor stator to push the piston to move towards the top dead center when the piston moves to the bottom dead center; and
   a transmission mechanism, comprising:
      a rotor connecting member, connected to the common rotor; and
      a piston connecting member, connected to the piston and the rotor connecting member, wherein the piston connecting member drives the rotor connecting member, so that a moving direction of the common rotor is opposite to that of the piston.

11. The engine device according to claim 10, further comprising an extraction fan disposed at an end of the engine device different from the engine.

12. The engine device according to claim 10, wherein the transmission mechanism further comprises a gear structure or a cam structure for connecting the rotor connecting member and the piston connecting member.

* * * * *